Sept. 3, 1929.   C. SMITH   1,726,591
BRAKE FOR DIFFERENTIAL MECHANISM
Filed Feb. 1, 1924   2 Sheets-Sheet 1
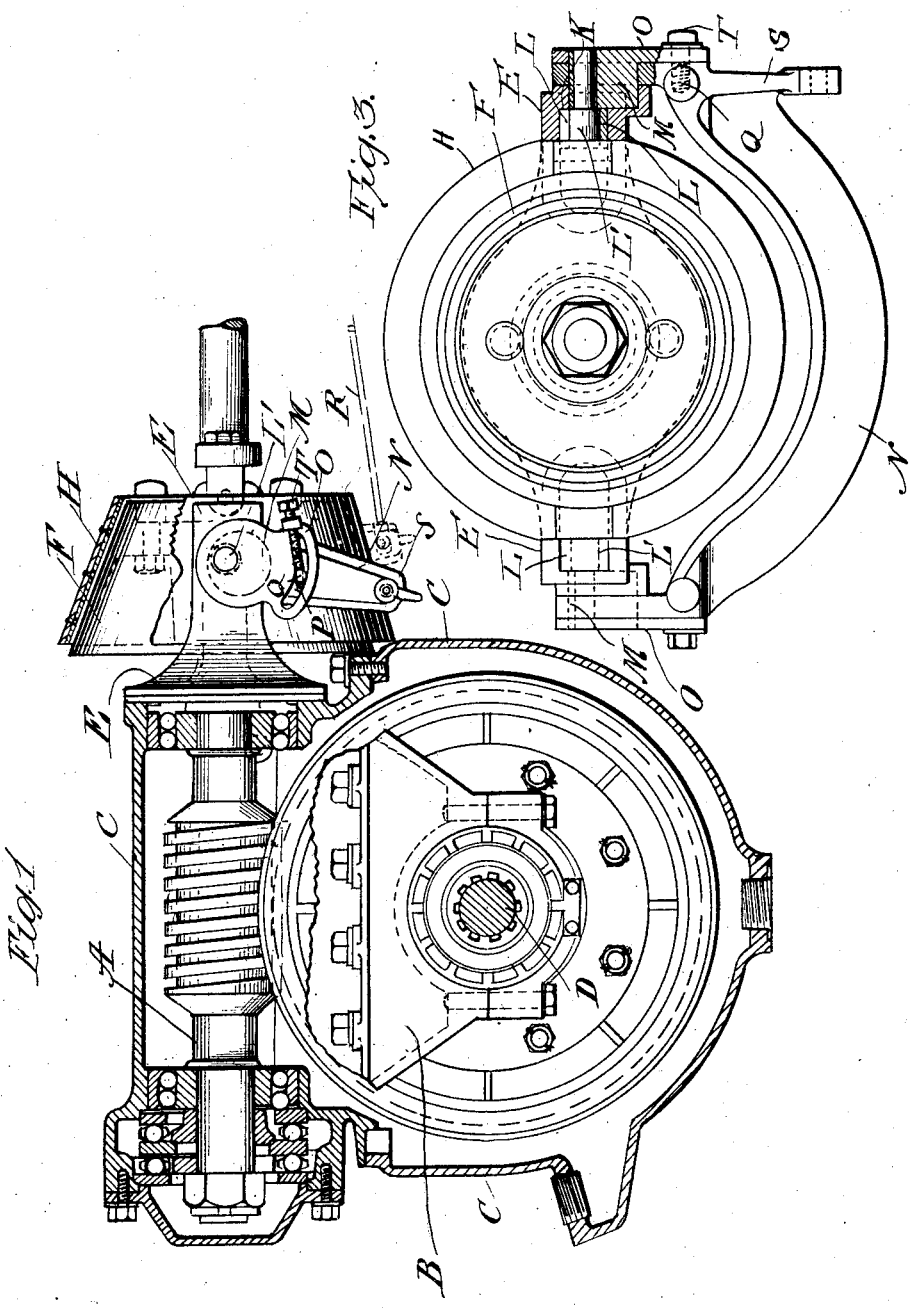
Inventor
Wm C. Smith
by Wm M. Monroe
Attorney

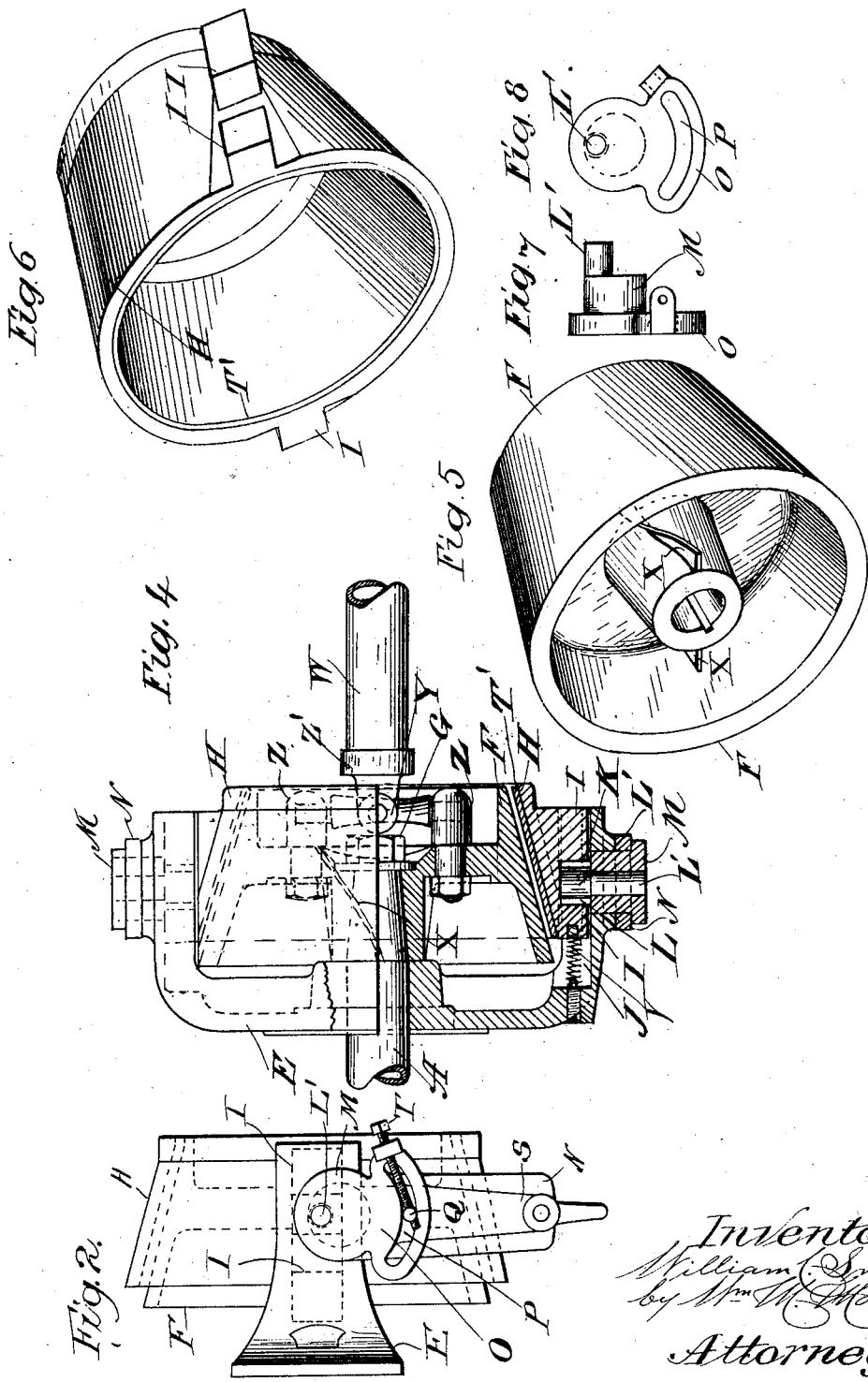

Patented Sept. 3, 1929.

1,726,591

UNITED STATES PATENT OFFICE.

WILLIAM C. SMITH, OF CLEVELAND, OHIO.

BRAKE FOR DIFFERENTIAL MECHANISM.

Application filed February 1, 1924. Serial No. 690,008.

The invention relates to improvements in braking mechanism for motor cars, and the particular object is to assemble the braking mechanism into a unitary structure with the differential mechanism of the car, in such a manner that the braking action will be confined thereto, and will act jointly and simultaneously upon both divisions of the rear axle, and by checking the movement thereof will prevent any advance movement of either rear wheel and will prevent the possibility of skidding. Also the positioning of the brake mechanism in direct operative relation with the differential mechanism and its housing, will eliminate all unusual strain upon the main propeller shaft, and will also prevent the vibration due to the action of the brake, from being transmitted to the frame.

The brake may be used singly or in connection with the ordinary braking mechanism of the car and simultaneously therewith, if desired, and a common source of control may be employed.

The device comprises, a conical brake member secured to the worm shaft, or other operating shaft of the differential mechanism, a brake drum or complementary brake member sleeved over said conical member and slidingly movable over said cone, a support attached to the housing of the differential mechanism and worm shaft, in which support said brake drum is slidingly movable, and mechanism for operating said brake drum on said support, and for adjusting said operating mechanism.

The invention also includes a brake cone attached to one extremity of said worm shaft, said cone being provided with means for attaching thereto a universal joint with which the main propeller shaft is operatively connected.

It also includes a brake cone provided with fanning means for producing a current of air through the brake parts, to effect the cooling action thereon.

The invention further includes a yoke fixed upon the said housing and having guides thereon parallel with the axis of said worm shaft and a brake drum slidingly movable in said guides. It includes a fork passing around said brake drum and pivoted in the sides of said yoke, and wrist pins, forming said pivots, said wrist pins being provided with eccentric engaging means for said brake drum and operated to move said brake drum by the movements of said fork, and links or arms fixedly attached to said wrist pins and adjustable in said fork. It includes means for adjusting the positions of said links to control the throw of said eccentrics and take up the unavoidable wear upon the lining of said brake drum.

It includes the application of a tension spring to take up any lost motion in the action of the eccentric pins.

It includes detachable shoes or bushings in which said eccentric pins operate.

It is further understood that the brake mechanism may be attached to either end of the worm shaft and may be quite independent of the main propeller shaft.

The invention further includes the combination and arrangement of parts and construction of details, hereinafter described, and illustrated in the accompanying drawings and specifically pointed out in the claims.

In the accompanying drawings, Fig. 1 is a longitudinal section showing the manner of attaching the device to the operating shaft of the differential mechanism of a motor car, Fig. 2 is an enlarged side elevation of the braking mechanism, Fig. 3 is an end elevation thereof, Fig. 4 is a horizontal central section of Fig. 3, Fig. 5 is a perspective of the conical brake member and Fig. 6 is a perspective of the outer brake drum, Figs. 7 and 8 are side elevations and front elevation respectively of the eccentric bearing wrist and link.

In these views, A is the operating shaft for the differential mechanism which is indicated by the letter B, C is the housing therefor, D is one portion of the divided axle, E is a yoke through which the shaft A passes. This yoke is rigidly secured to the housing C.

Within this yoke a conical brake member F is secured to the extremity of the operating shaft A by means of the nut G. Exterior to the brake cone and encircling the same is positioned the complementary brake sleeve or drum H which is supported at diametrically opposite points upon the arms of the yoke E. Projecting ribs I, I upon the brake drum at these points are movable longitudinally of the shaft in slots J, J in the inner sides of the said arms. In vertical openings K, K in these ribs are inserted shoes or bushings L in which the eccentric operating pins L', L', are mounted.

These pins are eccentrically secured upon the outer ends of the wrists M, M which form pivot members for the fork N in the yoke E. This fork passes underneath the brake drum and by its oscillating movement operates the wrists and eccentric pins L'. To the wrist M, M are secured the arms or links O, O having the arc-shaped slots P, P therein, in which the pins Q, Q attached to the yoke N engage, and screws T, T provide means for adjusting the throw of the links O, O and the eccentric pins L', L', and determines the limit of the sliding movement of the brake drum over the cone F, thus enabling it to take up the wear upon the lining of the drum. This lining is made of non-inflammable material.

The brake rod R is attached to the lower end of an arm S on the fork N, and oscillates the fork and eccentric pins to operate the brake drum. V is a spring controlling the action of the brake drum.

The brake rod may be actuated independently by any desired foot lever, or hand lever accessible to the driver of the car, or by air driven or hydraulic mechanism of any kind, but may work in unison with the brake rods of the wheel brakes if it is desired in addition to use the ordinary wheel brakes of the car. T' is the non-inflammable lining for the brake drum. At X, X are shown spiral blades secured to the hub of the cone which serve as fan blades to cause the rapid circulation of the air through the entire brake mechanism to maintain a low temperature therein.

In Fig. 4 a universal joint Y is shown connecting the brake cone F with the main propeller shaft W. The joint is X-shaped and two arms are pivoted upon the lugs Z secured to the cone and two upon a yoke Z' on the shaft.

The action of the device may be summed up as follows:

When it is desired to apply the brake, power is applied to the operating rod R and arm S, and the fork N is swung to operate the eccentric pins L' L' and move the shoes or bushings L in the vertical openings K, K, in the projecting ribs I, I, upon the brake drum or sleeve H and in this manner force the brake drum H into contact with the brake cone F.

When it is desired to adjust the amount of throw of the eccentrics as when the parts become warm, the screw T is operated to adjust the relative angle at which the eccentric pins stand to the bushings, thus throwing the bushings and the brake drum into closer relation to the brake cone before the brake rod is operated.

Having described the invention what I claim as new and desire to secure by Letters Patent is:

1. In a device for the purpose set forth, the combination with differential mechanism and an operating shaft therefor, and a housing therefor, of a cone brake member secured upon one extremity of said shaft, a yoke fixed upon said housing, the sides of said yoke having longitudinal guides therein, a complementary brake drum sleeved over said cone, and provided upon opposite sides with engaging means for said guides in said yoke, a fork, opposite wrists mounted in said fork and pivotally mounted in said yoke, eccentric pins in the extremities of said wrists, engaging means therefor in the sides of said brake drum, and means for oscillating said fork to operate said brake drum.

2. In a device for the purpose set forth, the combination with differential mechanism and an operating shaft therefor, and a housing therefor, of a cone brake member secured upon one extremity of said shaft, a yoke fixed upon said housing, the sides of said yoke having longitudinal guides therein, a complementary brake drum sleeved over said cone, and provided upon opposite sides with engaging means for said guides, a fork, opposite wrists mounted in said fork and pivotally mounted in said yoke, eccentric pins in the extremities of said wrists, engaging means therefor in the sides of said brake drum, means for oscillating said fork to operate said brake drum, and external link arms to which said wrists are fixedly secured, said arms being adjustably secured for swinging movement in said fork.

3. In a device for the purpose set forth, the combination with differential mechanism and an operating shaft therefor and a housing therefor, of a cone brake member secured upon one extremity of said shaft, a yoke fixed upon said housing, the sides of said yoke having longitudinal guides therein, a complementary brake drum sleeved over said cone, and provided upon opposite sides with engaging means for said guides in said yoke, a fork, opposite wrists mounted in said fork and pivotally mounted in said yoke, eccentric pins in the extremities of said wrists, engaging means therefor in the sides of said brake drum, means for oscillating said fork to operate said brake drum, said arms being provided with arcuate slots, and said fork being provided with projecting pins engaged in said slots, and adjusting screws on said arms engaging with said pins.

4. In a device of the character described, in combination with an operating shaft, a cone brake member thereon, a complementary brake drum sleeved thereover, a bearing for said shaft, a yoke thereon in the sides of which said brake drum is slidably movable, a swinging fork pivoted in said yoke and eccentric engaging means on the pivots of said fork for operating said brake drum.

5. In a device of the character described, in combination with an operating shaft, a cone brake member thereon, a complementary brake drum sleeved thereover, a bearing for said shaft, a yoke thereon in the sides of which said brake drum is slidably movable, a swinging fork pivoted in said yoke and eccentric engaging means on the pivots of said fork for operating said brake drum, links mounted upon said pivots, and adjusting means for varying the angular positions of said links and eccentrics relatively to the arms of said fork.

In testimony whereof, I hereunto set my hand this 25th day of January, 1924.

WILLIAM C. SMITH.